UNITED STATES PATENT OFFICE.

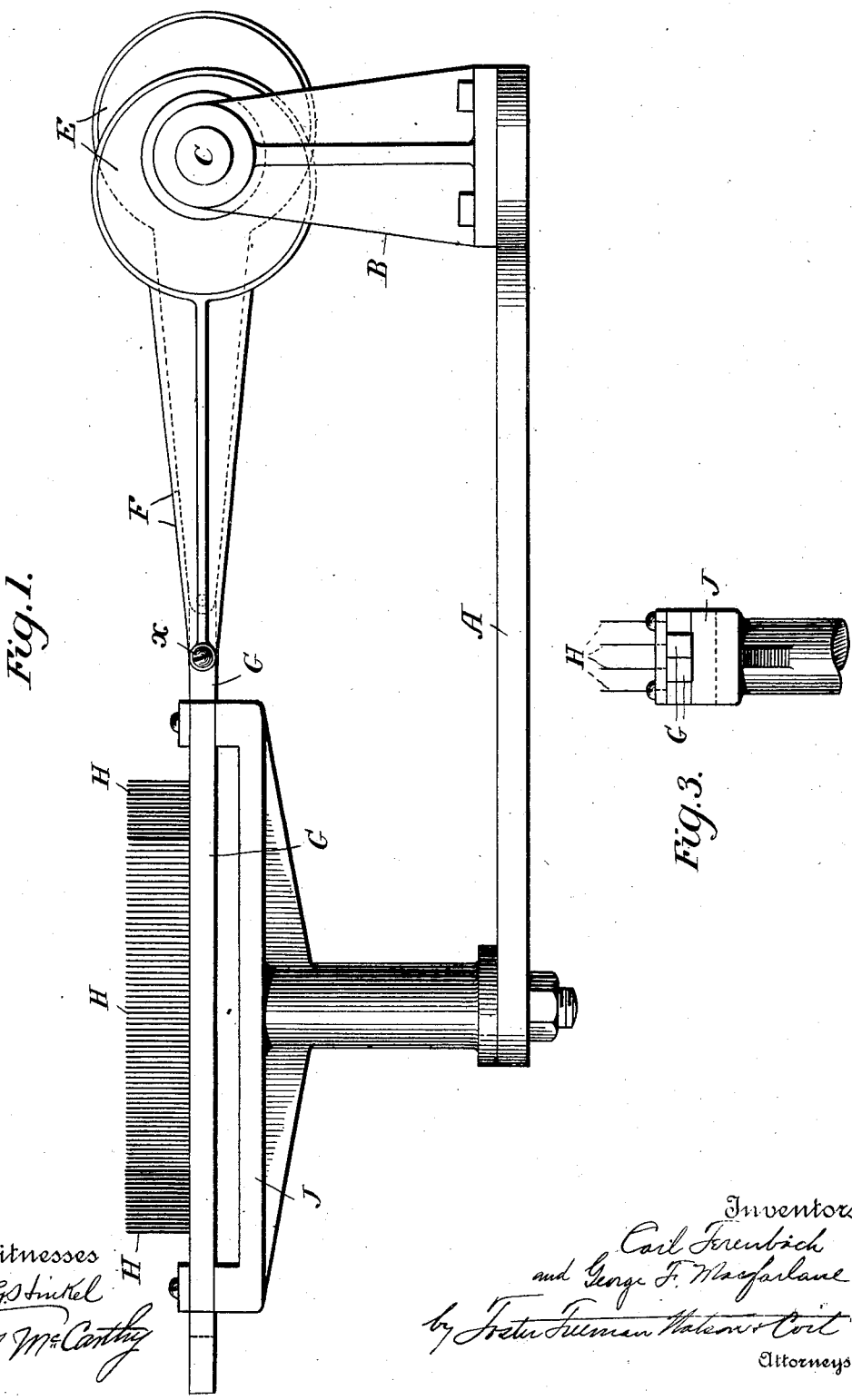

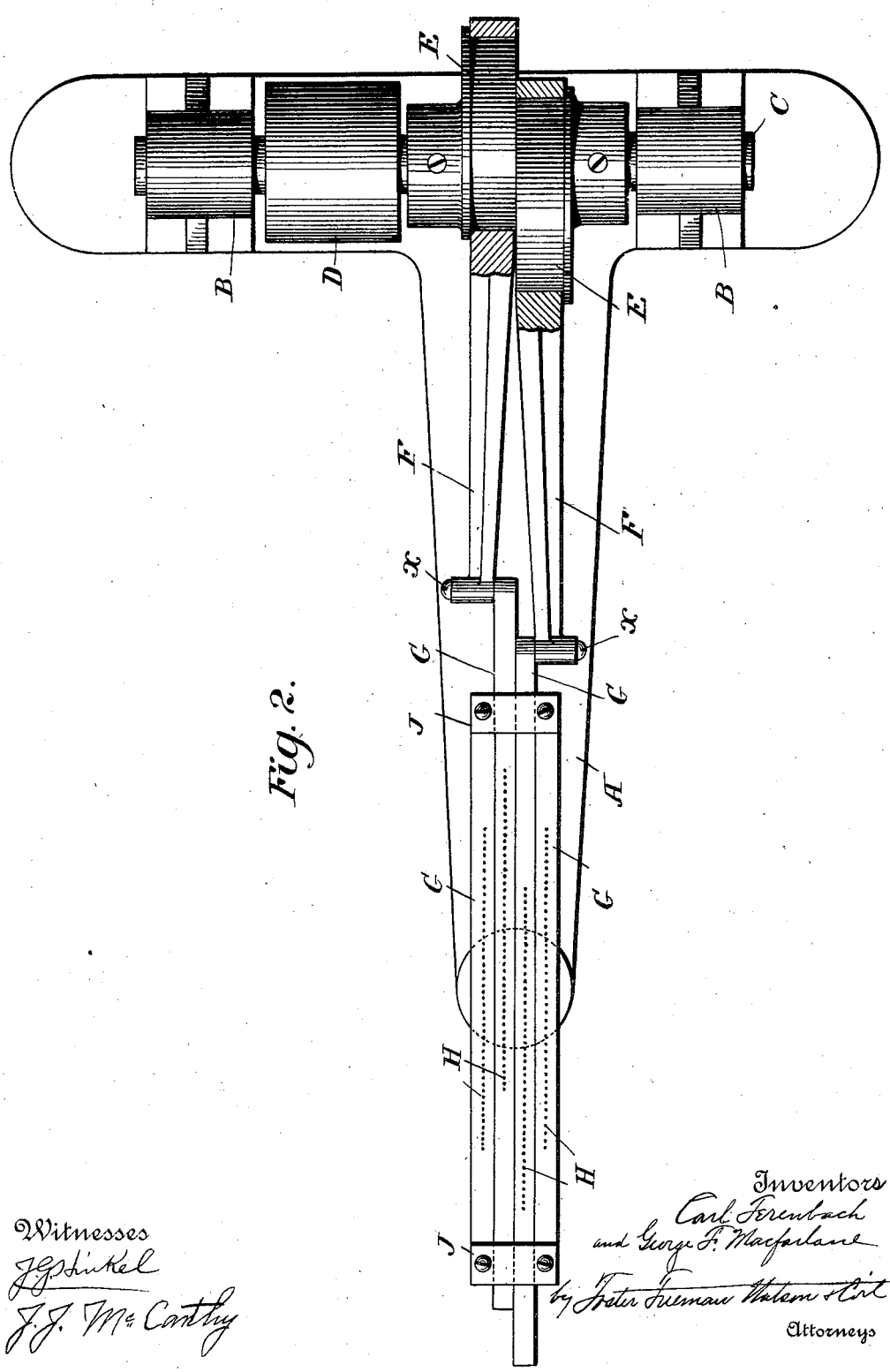

CARL FERENBACH AND GEORGE F. MACFARLANE, OF WILKES-BARRE, PENNSYLVANIA.

MACHINE FOR DEGUMMING SILK.

No. 862,326.     Specification of Letters Patent.     Patented Aug. 6, 1907.

Application filed May 17, 1907. Serial No. 374,249.

*To all whom it may concern:*

Be it known that we, CARL FERENBACH and GEORGE F. MACFARLANE, citizens of the United States, and residents of Wilkes-Barre, in the county of Luzerne and State of Pennsylvania, have invented certain new and useful Improvements in Machines for Degumming Silks, &c., of which the following is a specification.

My invention has for its object to de-gum silks, etc., that is to so operate upon a mass of silk as to break up the gummy matter which causes the fibers to adhere or pack together, and reduce the mass to a fine flossy state, and to this end my invention consists in subjecting the mass to the action of series of fingers or teeth relatively reciprocated so as to rapidly bend portions of the mass alternately to opposite sides, as fully set forth hereinafter and as illustrated in the accompanying drawing, in which—

Figure 1 is a side view showing one form of apparatus in which my invention may be embodied; Fig. 2 is a plan view; and Fig. 3, an end elevation.

The apparatus consists essentially of series of rows of teeth or pins adapted to penetrate the mass of silk to be operated upon, and means whereby the alternate pins may be rapidly reciprocated in respect to each other, so as to alternately bend short lengths of the material in opposite directions, thereby breaking up the gummy matter upon the silk, and reducing it to a fine, flossy condition. These rows of pins may be in straight lines parallel to each other, or upon curved lines, and the pins may be mounted upon any suitable holders so that the pins of one row may be shifted longitudinally in respect to those of the next row or rows, and any suitable means may be employed for imparting such reciprocation.

As shown the parts are mounted upon a suitable base A, and in bearings of standards B rotates a shaft C carrying a driving pulley D to which rotation may be imparted by means of a suitable belt. Upon the shaft is any desired number of eccentrics E, each of which receives the strap of a connecting rod F, and each of the latter is jointed by a pin $x$ at the forward end to one of the holders or carriers G of one of the series of pins H. As shown, each carrier is a bar sliding in guides of a bracket J, mounted on the base A, there being any suitable number of parallel bars G, each carrying its series of teeth and constituting practically a comb.

While alternate reciprocating movements may be imparted to all of these bars, I preferably make use of four series of teeth or combs, the bars G of the two outside combs being secured fixedly in the bracket J, while the two inside bars are adapted to slide, and the eccentrics are so set that the movements are always in alternate directions, so that each of the movable bars reciprocates in respect to both the movable and fixed bars on opposite sides. With the apparatus thus constructed, the operator places the hank or skein of silk upon the combs transversely to the latter, so that the teeth or fingers will penetrate upward, and as they are alternately and rapidly reciprocated the portions of the silk in contact with the teeth are rapidly bent back and forth in opposite directions with the result that the gummy matter is speedily broken up and the silk reduced to a soft flossy condition, the mass being drawn by hand through the teeth or removed and replaced in different positions, as may be desired.

While I have referred to operating upon masses of silk, it will be evident that other fibers may be treated in like manner.

Without limiting myself to the precise construction and arrangement of parts set forth, I claim as my invention:—

1. An apparatus for de-gumming silks, provided with series of teeth for dividing the mass at different points, and with means for imparting relative, alternate, reciprocating movements to the teeth.

2. In a machine for de-gumming silks, the combination of a plurality of series of teeth arranged side by side, and means for imparting longitudinal reciprocating movements to the teeth in respect to each other.

3. In a machine for de-gumming silks, the combination of supports or carriers for a series of teeth or fingers, and means for rapidly and alternately reciprocating one or more of the carriers in respect to the other for the purpose specified.

4. The combination in a machine for de-gumming silks, of a plurality of parallel bars, each provided with a series of teeth, a shaft at right angles to the bars provided with eccentrics differently set, straps encircling the eccentrics and connected to the different bars.

In testimony whereof we affix our signature in presence of two witnesses.

CARL FERENBACH.
      GEORGE F. MACFARLANE.

Witnesses:
  DELBERT BARNEY,
  JOHN P. POLLOCK.